Jan. 6, 1959 F. McCALL ET AL 2,867,070
DRIVE MEANS FOR RECIPROCATING CUTTING ASSEMBLY
Filed July 24, 1956 6 Sheets-Sheet 1
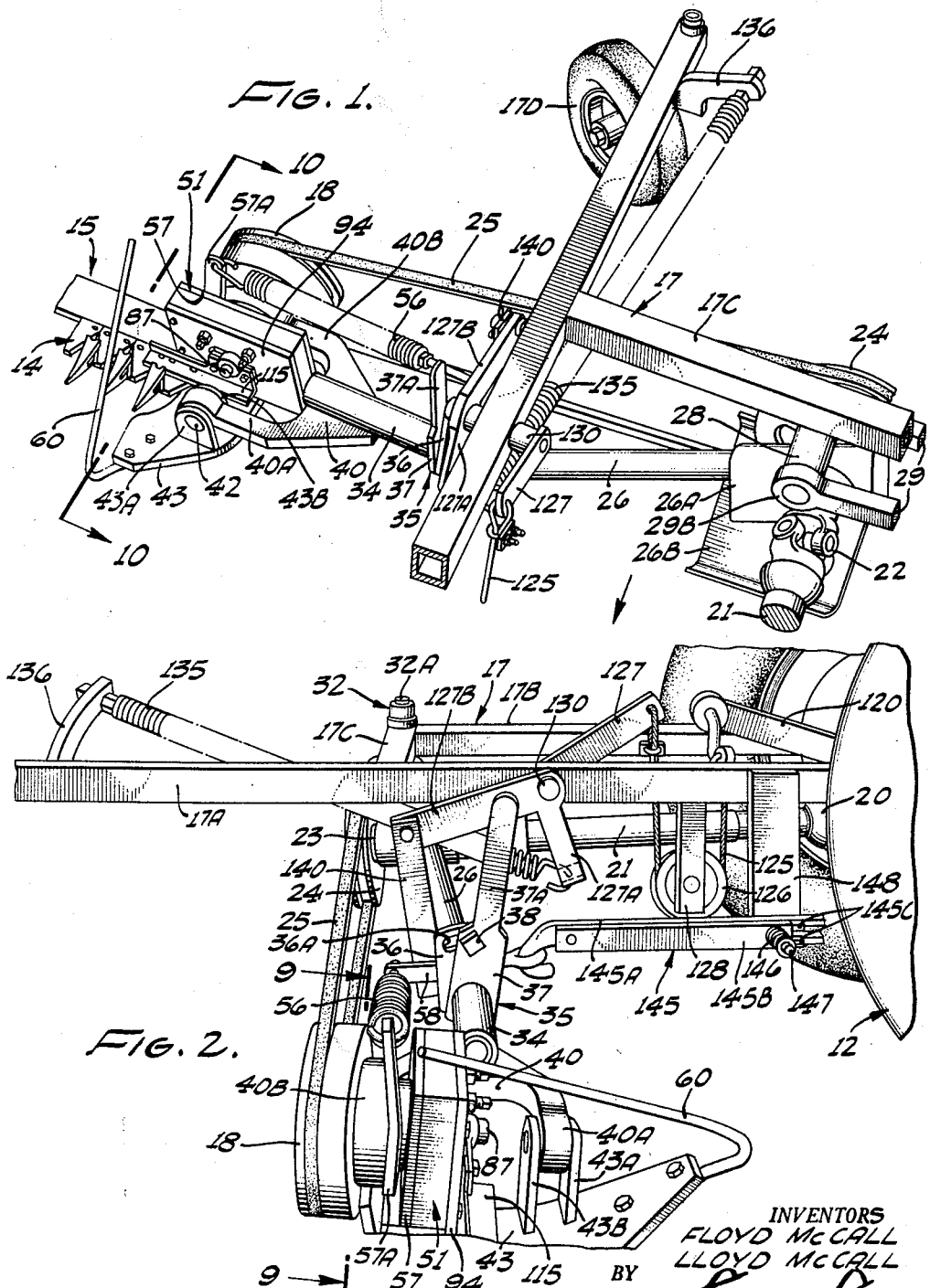
INVENTORS
FLOYD McCALL
LLOYD McCALL
BY
Lyon & Lyon
ATTORNEYS

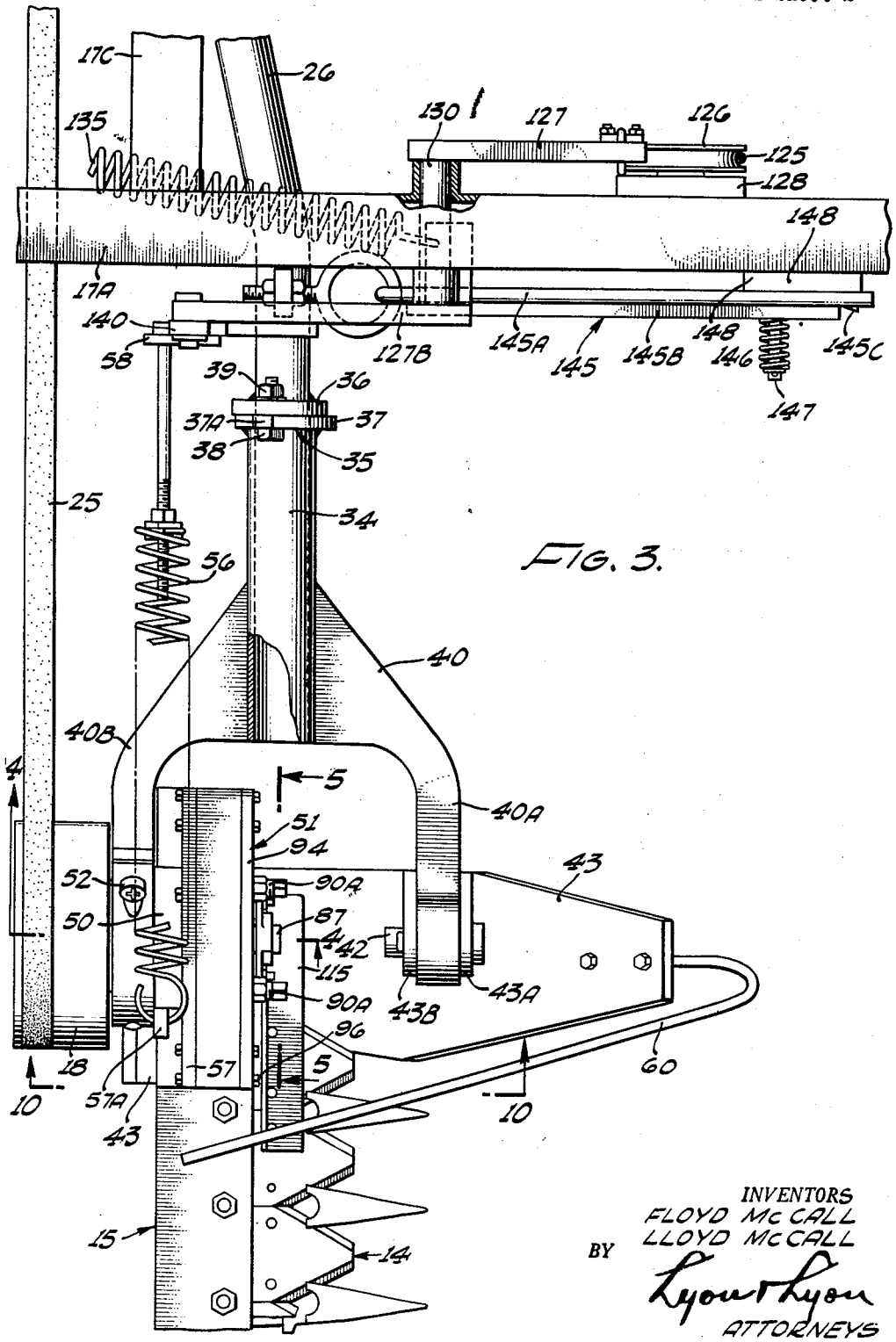

Jan. 6, 1959

F. McCALL ET AL 2,867,070

DRIVE MEANS FOR RECIPROCATING CUTTING ASSEMBLY

Filed July 24, 1956

INVENTORS
FLOYD McCALL
LLOYD McCALL
BY
Lyon & Lyon
ATTORNEYS

INVENTORS
FLOYD McCALL
LLOYD McCALL
BY Lyon & Lyon
ATTORNEYS

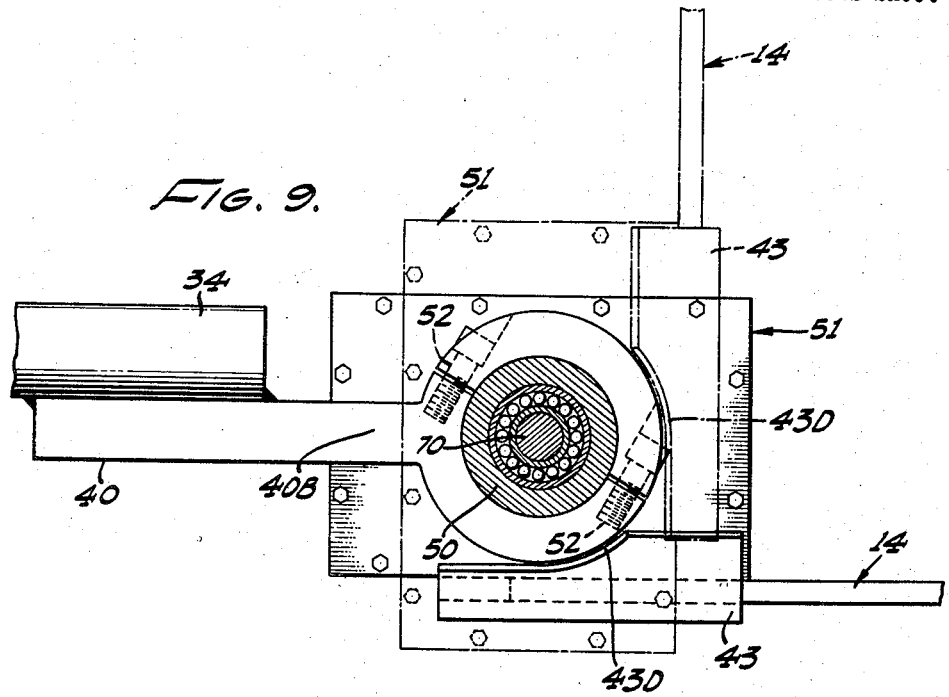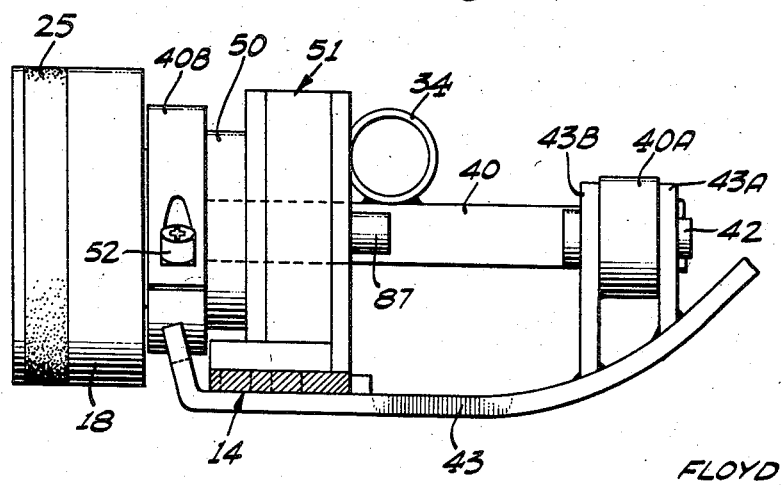

Jan. 6, 1959   F. McCALL ET AL   2,867,070
DRIVE MEANS FOR RECIPROCATING CUTTING ASSEMBLY
Filed July 24, 1956   6 Sheets-Sheet 6
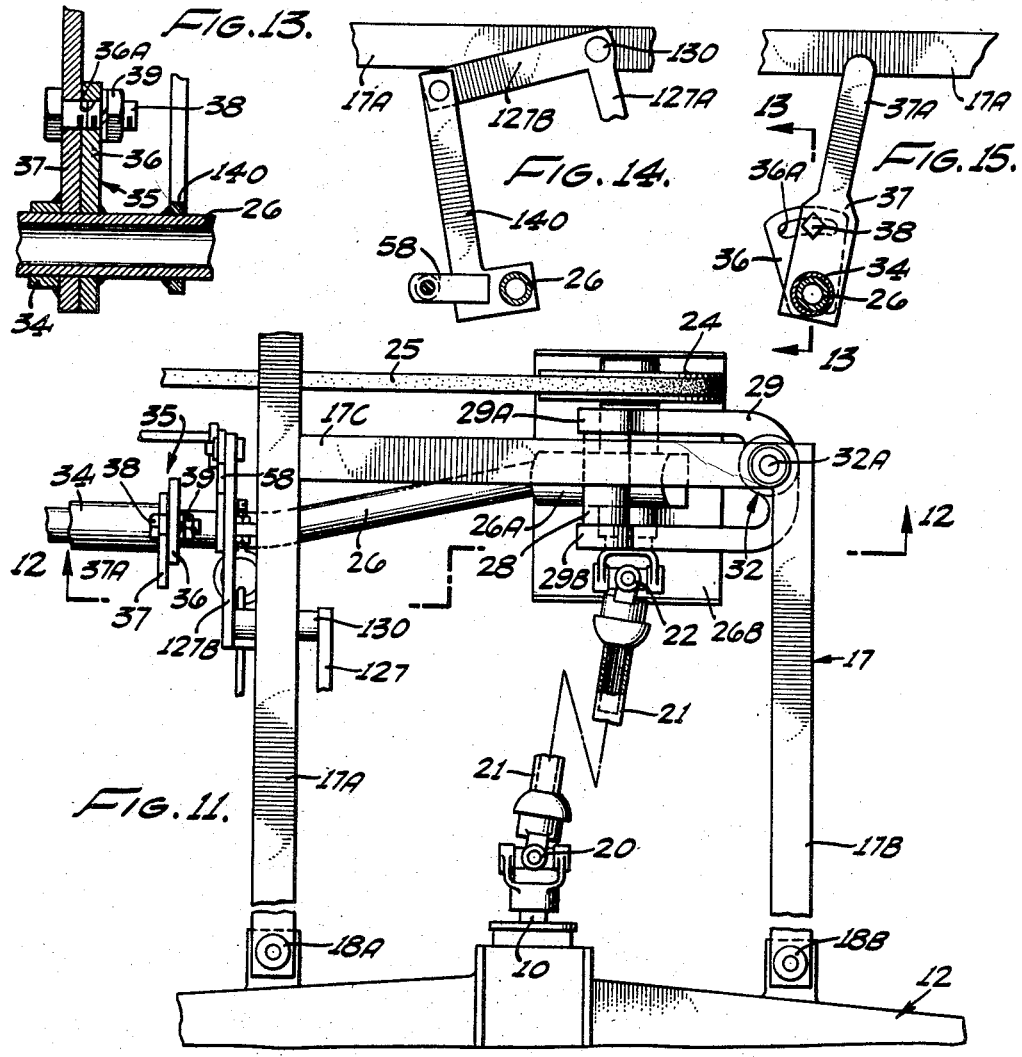
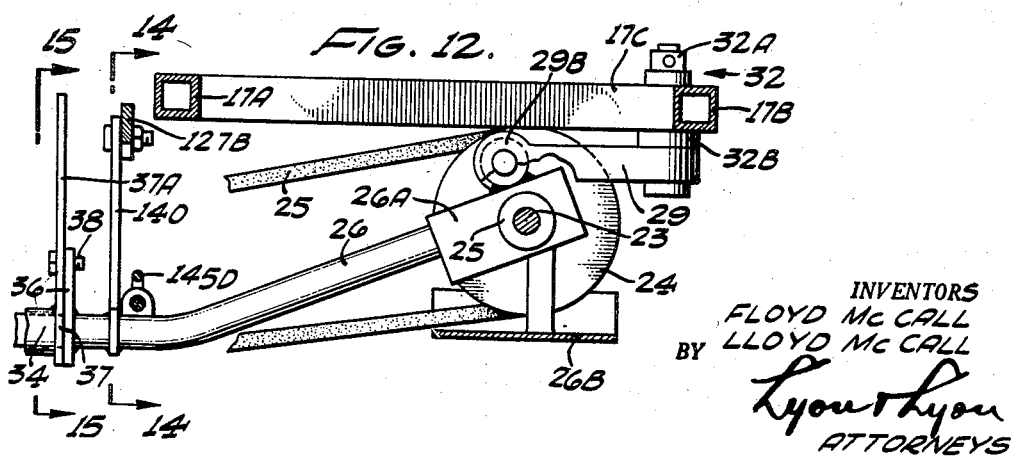
INVENTORS
FLOYD McCALL
LLOYD McCALL
BY
Lyon & Lyon
ATTORNEYS

United States Patent Office 2,867,070
Patented Jan. 6, 1959

2,867,070
DRIVE MEANS FOR RECIPROCATING CUTTING ASSEMBLY

Floyd McCall and Lloyd McCall, Romoland, Calif.

Application July 24, 1956, Serial No. 599,774

4 Claims. (Cl. 56—296)

The present invention relates broadly to motion converting devices, and, more specifically, to devices intended to convert rotary movement to reciprocating movement for driving a sickle knife in a mower mounted on the side of a tractor. The present application constitutes a continuation-in-part of our application, Serial No. 470,356, filed November 22, 1954, and now abandoned.

The present invention contemplates generally an improved structure for use on side mounted mowers which avoid the use of pitman type connections and their attendant disadvantages. The present arrangement involves the use of a new motion converting device that allows all of the power required for driving a sickle knife to be transferred in rotary form from the power take-off shaft of a tractor to a mower, thereby avoiding the use of members which otherwise are required to transmit power in thrust form.

It is, therefore, a general object of the present invention to provide an improved side mounted mower for obtaining the above-indicated results.

A specific object of the present invention is to provide an improved side mounted mower in which all of the driving power is transmitted in rotary form from the power take-off shaft of a tractor to the mower itself.

Another specific object of the present invention is to provide an improved motion converting arrangement which allows the above-indicated results to be obtained.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings, in which:

Figures 1 and 2 are different perspective views illustrating an arrangement embodying features of the present invention.

Figure 3 is an enlarged fragmentary plan view of the arrangement illustrated in Figures 1 and 2.

Figure 9 is a sectional enlarged view taken substantially on the line 9—9 of Figure 2.

Figure 10 is an enlarged view taken generally in the direction indicated by the line 10—10 of both Figures 1 and 3.

Figure 11 is a top fragmentary plan view illustrating the manner in which the assembly is mounted on a tractor.

Figure 12 is a view taken generally on the line 12—12 of Figure 11.

Figure 13 is an enlarged sectional view taken on the line 13—13 of Figure 15.

Figure 4:
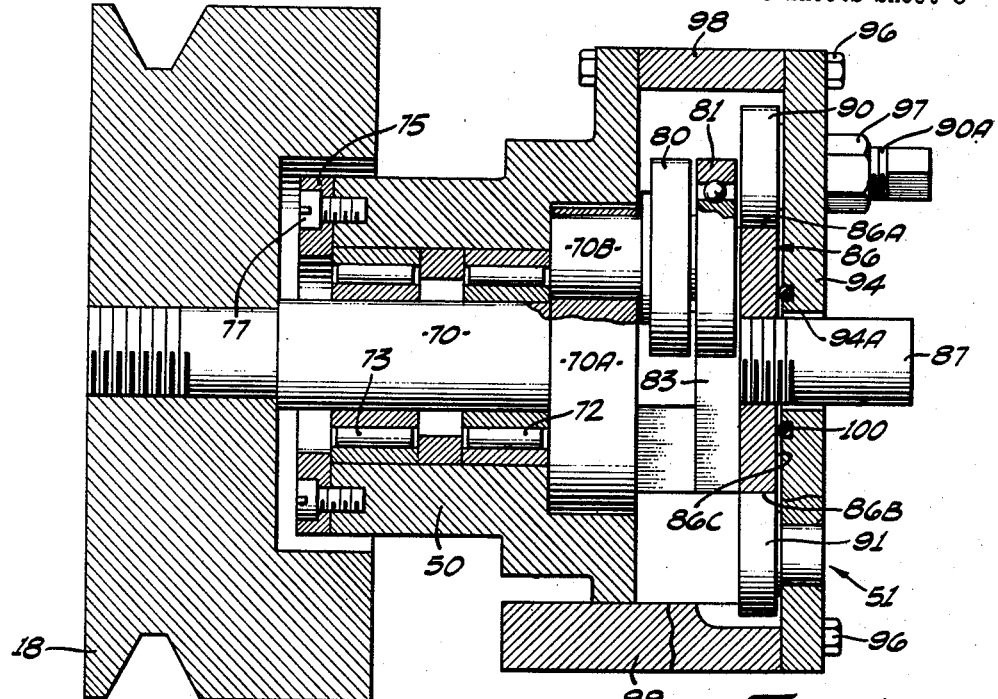
Figure 4 is an enlarged sectional view taken substantially on the line 4—4 of both Figures 3 and 5.

Figures 14 and 15 are views taken as indicated by the lines 14—14 and 15—15 in Figure 12.

The arrangement illustrated is intended to convert rotary movement into reciprocating movement and to be driven by the power take-off shaft 10 of a conventional tractor 12 for reciprocating the sickle knife 14 of the side mounted mower 15.

The mower 15, in general, is supported on a chassis having the general reference numeral 17. The chassis 17, as shown in Figures 11 and 1, is in the form of a box frame with two arms 17A and 17B thereof connected to spaced points on the tractor 12 by conventional trailer hitches 18A and 18B which allow some slight up-and-down movement of the chassis 17 in use, and providing also, of course, convenient means for quickly attaching and detaching the frame or chassis 17 on the tractor 12. More specifically, the chassis 17 includes the rearwardly extending arms 17A and 17B and a cross arm 17C with the arm 17A being prolonged, as shown in Figure 1, and having swivelly mounted thereon a ground engaging wheel 17D. Rotary movement is imparted from the power take-off shaft 10 (Figure 11) to the driving pulley 18 (Figure 1) of the mower 15 through connections which include the following: power take-off shaft 10, universal joint 20, extensible driving shaft 21, universal joint 22, shaft 23 (Figure 12) upon which is mounted the pulley 24, and the belt 25 which passes over the pulleys 24 and 18. The aforementioned shaft 23 is rotatably supported on the chassis 17 in the following manner. The shaft 23 is rotatably supported in a sleeve 25 which passes through and is affixed to the enlarged tubular end 26A of the tubular supporting member 26. This tubular end 26A in turn is welded to a tubular element 28 which has its opposite ends journalled for rotation in bearings 29A, 29B formed on the ends of the U-shaped supporting member or yoke 29. The tubular end 26A has also affixed thereto a skid 26B which, in normal operation, is spaced about eight inches above the ground. This member 29 is pivotally mounted on substantially a vertical axis on the chassis 17, as illustrated in Figures 11 and 12, by the pivoted connection indicated by the reference numeral 32. It is noted that this pivotal connection 32 involves a generally vertically extending pin 32A which is pivotally mounted in the bearing 32B affixed generally in a corner of the chassis 17, such corner being defined at the junction of frame members 17B and 17C.

Thus, the supporting member 26 (which is described in more detail later for supporting the mower assembly) is permitted to pivot about the axis of the driving shaft 23 and also about an axis which extends generally perpendicular to the axis of shaft 23, i. e., the axis of pin 32A, so that, in general, the supporting member 26 is considered to be supported by a universal type of connection on the supporting frame 17.

This supporting member 26 is tubular and, as illustrated in Figures 12 and 13, extends through a tube 34. These coaxially extending tubular members 26 and 34 are maintained in adjusted relationship by a clamp structure 35, illustrated in Figure 13 in the form of a pair of plates 36, 37, bolt 38 and nut 39. Plate 36 is welded on the tube 26. The plate 37 is welded on the tube 34 and the bolt 38, as illustrated in Figure 2, passes through a slightly oversized opening in the plate 37 and an elongated adjustment slot 36A in plate 36. The plate 37 is provided with an extension 37A in the form of a handle to allow convenient adjustment of the shaft 34 with respect to shaft 26.

Tube 34 has its outer end welded to a supporting plate 40 which is generally U-shaped and pivotally supports the mower assembly 15. For this purpose, plate 40, in the form of a fork, has one of its ends 40A pivotally mounted on the pin 42, passing through a pair of upstanding bracket members 43A and 43B on plate 43. The other arm 40B is clamped on the casing 50 of the motion converting mechanism 51, as illustrated in connection with Figures 3, 9 and 10. More specifically, the arm 40B, at its extremity, comprises a pair of semi-circular elements which are clamped by the releaseable screws 52 to the casing 50. It is noted in connection with Figure 10 that the plate or skid 43 has its left hand end provided with a curved portion 43D (Figure 9) for engaging the arm 40B, so that the skid 43, in fact, is considered to be pivoted not only with respect to the arm 40A but also with respect to the arm 40B.

The weight of the mower assembly 15 is counterbalanced, at least to some extent, by the tension spring 56, having one of its ends attached to the bracket arm 57A, secured to the plate 57 forming a part of the housing of the mechanism 51. The other end of spring 56 is secured to an arm 58 (Figure 3) affixed to the supporting arm 26.

The skid 43 has secured thereto an upwardly supported rod 60 in front of the cutting blades so as to act generally as a shield in preventing the hay from moving generally in the direction of rotating parts.

Figure 5:
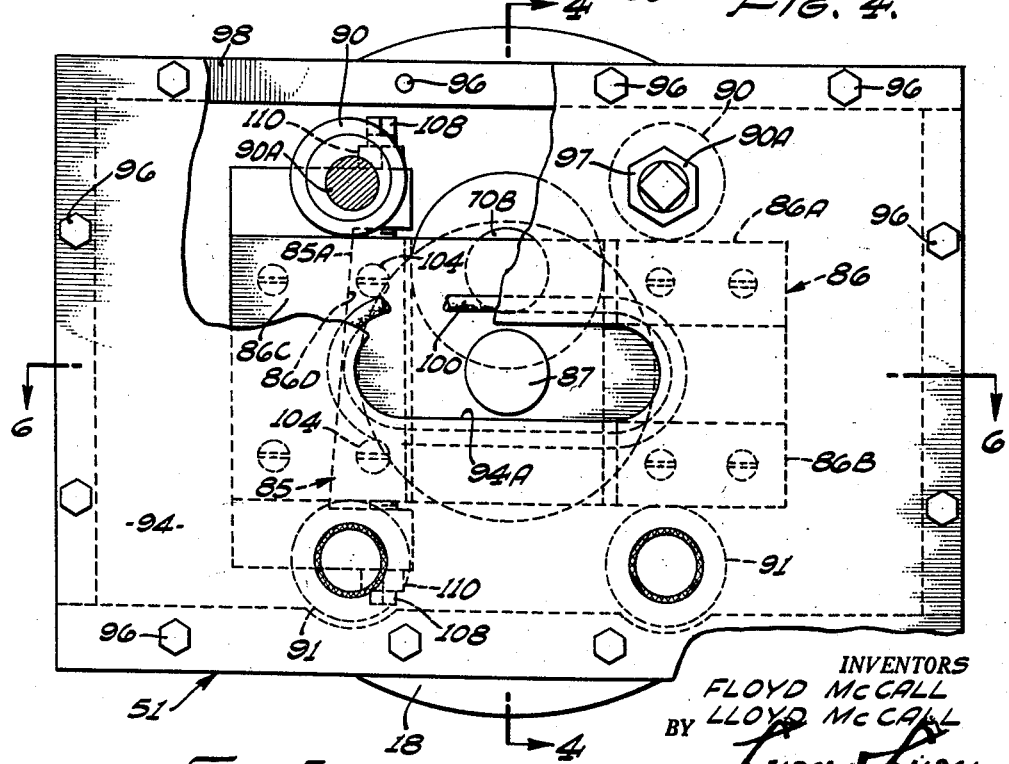
Figure 5 is an enlarged view in side elevation taken generally in the direction indicated by the line 5—5 in Figure 3, with, however, portions of the structure broken away to illustrate internal construction.
Figure 6:
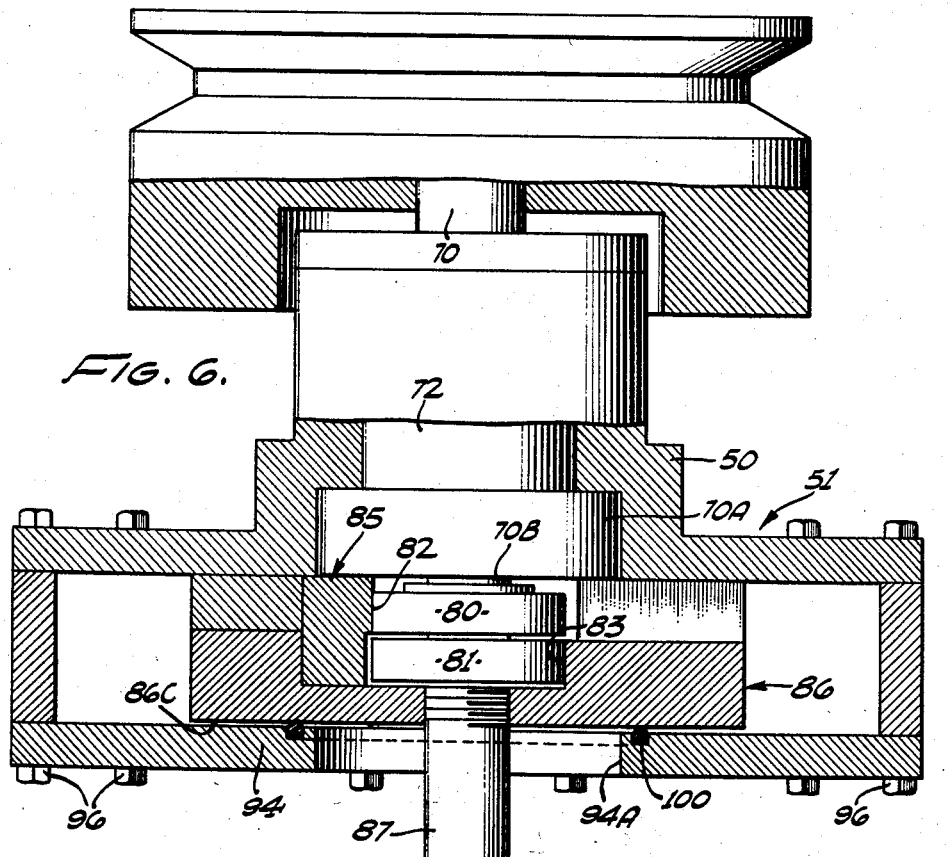
Figure 6 is an enlarged sectional view taken substantially on the line 6—6 of Figure 5.
Figures 7, 8:
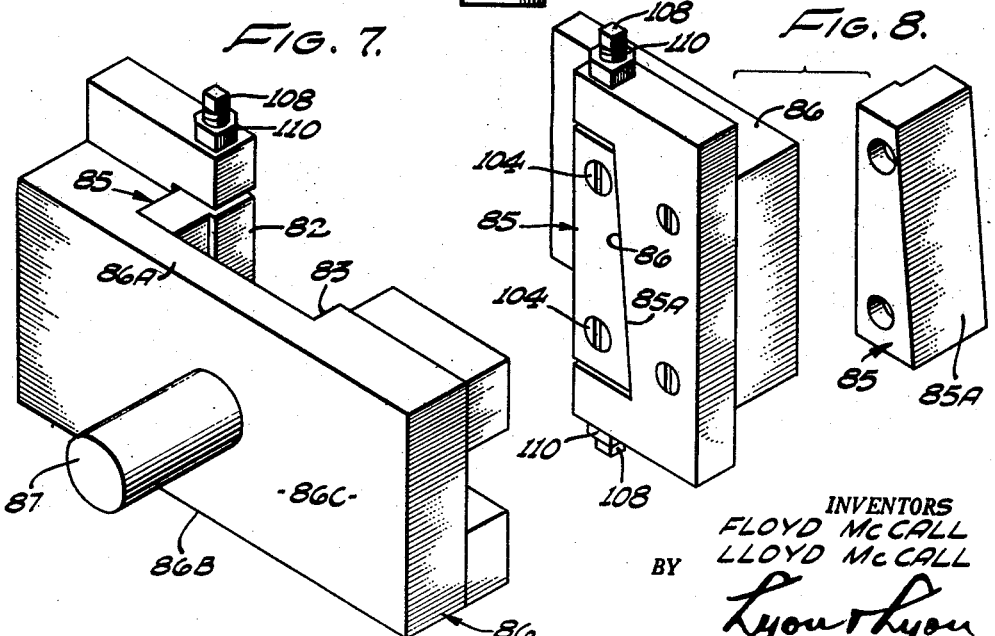
Figures 7 and 8 are enlarged perspective views illustrating certain elements illustrated in the previous figures with an element removed in Figure 8.

The motion of mechanism 51 includes generally a modified scotch yoke construction in which rotary movement is converted into reciprocating movement. The belt-driven pulley 18 is mounted on the shaft 70, and the shaft 70 is rotatably supported by spaced bearings 72, 73 (Figure 4) in the casing 50. One end of casing 50 is closed by the ring 75 which serves to retain the bearing member 73, such ring 75 being releasably secured by bolts 77. The shaft 70 is provided with an eccentric in the form of an integrally formed disc 70A having extending therefrom a shaft 70B upon which is mounted a pair of ballbearings 80 and 81. The inner race members of the bearings 80 and 81 are secured to the shaft 70B, while the other race members or rollers of these bearings are arranged to engage spaced walls 82 and 83, respectively (Figure 6). The wall 82 forms a wall of the replaceable insert 85, while the wall 83 forms a wall of the yoke member 86. This yoke member 86 has a shaft 87 extending therefrom through the wall of the housing and is engageable with the cutter bar to effect reciprocation of the same in accordance with rotary movement of the belt-driven pulley 18. The yoke 86, as seen in Figure 7, is generally in the form of a single elongated rectangular barmember, being provided with parallel spaced walls 86A and 86B which cooperate with rollers 90 and 91, serving as guides. The pair of rollers 90 and the pair of rollers 91 (Figures 4 and 5) are rotatably mounted on the releaseable end plate 94 forming a part of the housing. The end plate 94 is secured by bolts 96 to the housing plates 98 and 99. While the pair of rollers 91 rotate about fixed axes, the rollers 90 are eccentrically mounted so as to provide an adjustment in initial assembly, and for further adjustment which may be required due to resultant wear. In other words, the rollers 90 are eccentrically mounted on their supporting shaft 90A, and the shaft 90A is threaded in the plate 94. After adjustment, the nut 97 on shaft 90A is tightened. In order to seal the casing, an elliptically shaped O-ring 100 is recessed in the inner wall of plate 94, and such O-ring 100 frictionally engages the flat surface 86C (Figure 7) of the yoke member 86 so as to retain lubricant in the form of grease within the closed chamber which is defined generally by the end ring 75, casing 50, housing plates 98, 99, and end plate 94.

Another wear adjustment is provided by the adjustable insert 85 (Figures 7 and 8). The wear plate 85 is secured on the yoke member 86 by machine bolts 104, passing through elongated slots in the wear plate 85 and secured in the yoke 86. These machine screws 104 are tightened after an adjustment is secured by turning the adjustment screws 108 which are threaded in the yoke 86 and which have their inner ends engaging opposite ends of the wear plate 85. Once the adjustment is made, such adjustment is secured by tightening the locking nuts 110. For this purpose, the wear plate 85, as shown in Figure 8, is in the form of a truncated triangle with an inclined surface 85A thereof cooperating with the inclined surface 86D of the yoke member so that adjustment of the bolts 108 may cause the plate 85 to move in contact with its engaging roller 81.

One feature of this arrangement is that rollers are provided between contacting surfaces, with one roller 81 engaging only one surface and the roller 80 engaging another surface of the yoke. Furthermore, the rollers 90 and 91 rotate in opposite directions so as to obtain a balanced condition. Another feature is that the relatively movable parts are conveniently accessible upon removal of the end plate 94. While adjustment of the rollers 90 may be accomplished without removing the plate 94, it is necessary to remove the plate 94 to adjust the wear plate 85. Further, upon replacement of the plate 94, the housing is automatically sealed due to engagement of the sealing ring 100 with the yoke 86.

It is thus clear that rotation of the pulley 18 results in a reciprocating movement of the shaft 87 in the elongated slot 94A (Figure 6) in the end plate 94. This element 87 is attached to the movable cutter 14 by its engagement with a slightly oversized hole in such cutter. The cutter 14 is slideably mounted in conventional manner on a cooperating cutter element which is mounted on the plate 43. Movement of the movable cutter is guided by an angle iron guide 115 (Figure 3), mounted on the end plate 94.

Using this construction, it is clear that the mower assembly 15 may be raised or lowered by pivoting the same about the axis of the pin 42 which corresponds to the axis of the pulley 18; and the effort required to raise or lower such assembly 15 is minimized by the provision of the counterbalancing spring 56.

Additionally, the assembly may be raised by mechanism now described, using the conventional power actuated arm 120 (Figure 2) of the tractor. The arm 120 has secured thereto one end of the cable 125 which passes under the pulley 126, with the other end of the cable being secured to one end of arm 127. The pulley 126 is rotatably mounted on an arm 128, fastened to and extending from the chassis arm 17A. The arm 127 is in the form of a bellcrank lever and is pivotally mounted on the chassis arm 17A about the axis of the pin 130. One are 127A of the bellcrank lever has fastened thereto one end of the coil tension spring 135, the other end of the spring 135 being attached to a bracket arm 136, secured to the chassis arm 17A so that this spring 135 functions generally as a counterbalancing spring. Another arm 127B of bellcrank lever 127 has pin-connected thereto a link 140 which has its lower end fastened to the mower supporting arm 26, as shown in Figure 14. Thus, upon raising the power operated arm 120, the mower assembly may be lifted or adjusted in varying heights with respect to the ground.

Means are also provided to allow the mower assembly to pivot rearwardly and out of the way in case the cutting blades meet an obstruction, such as a rock. Such means involves an automatically extensible link 145 (Figure 2). This extensible link 145 comprises a pair of slideably mounted bars 145A and 145B, with a compression spring 146 pressing such bars together. The spring 146 is mounted on a pin 147, secured to the arm 148 which has its lower end secured to the chassis arm 17A. The bar 148 is provided with a raised cam abutment 145C which, in normal operation of the mower, prevents relative sliding movement between the bars 145A and 145B. Also, one end of bar 145A is provided with a hook portion 145D (Figure 12) which is connected to the mower supporting arm 26, as shown in Figure 12.

However, in those instances where the cutting blades meet an obstruction, such as a rock, the spring 146 and cam abutment 145C are no longer effective to maintain the bars 145A and 145 relatively stationary, and the cam abutment 145A slides under the bar 145B to allow the mower assembly to pivot out of harm's way about the axis of pin 32.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

We claim:

1. In an arrangement of the character described, a relatively stationary structure, a member rotatably mounted on said structure about a first axis, a pair of rollers rotatably supported on said member for rotation about a common axis which is off-center with respect to the first-mentioned axis, a yoke member having an apertured portion with the walls thereof engageable with said roller, one of said walls comprising a bar adjustably mounted on said yoke member, said structure incorporating guide means for guiding the movement of said yoke member along generally a straight line, said guide means comprising a single bar forming a part of said yoke member which is centrally located with respect to said first axis, said structure having roller means mounted thereon engageable with opposite sides of said bar, said roller means being adjustably mounted on said structure, and a reciprocable cutting assembly rigidly connected to said yoke member.

2. In an arrangement of the character described, a relatively stationary structure, a member rotatably mounted on said structure about a first axis, a roller rotatably supported on said member for rotation about an axis which is off-center with respect to the first mentioned axis, a yoke member having a wall thereof engageable with said roller, said structure incorporating guide means for guiding the movement of said yoke member along generally a straight line, said guide means comprising an elongated bar member which is centrally located with respect to said first axis and roller means engageable with opposite sides of said bar for guiding movement of the same, and a reciprocable cutting assembly rigidly connected to said yoke member, a second roller rotatably supported on said member coaxially with the first mentioned roller, said first mentioned roller and said second roller engaging different walls of said yoke member and rotating in opposite directions.

3. In an arrangement of the character described, a relatively stationary structure, a member rotatably mounted on said structure about a first axis, a roller rotatably supported on said member for rotation about an axis which is off-center with respect to the first mentioned axis, a yoke member having a wall thereof engageable with said roller, said structure incorporating guide means for guiding the movement of said yoke member along generally a straight line, said guide means comprising an elongated bar member which is centrally located with respect to said first axis and roller means engageable with opposite sides of said bar for guiding movement of the same, and a reciprocable cutting assembly rigidly connected to said yoke member, a second roller rotatably supported on said member coaxially with the first mentioned roller, said first mentioned roller and said second roller engaging different walls of said yoke member and rotating in opposite directions.

4. In an arrangement of the character described, a relatively stationary structure, a member rotatably mounted on said structure about a first axis, a roller rotatably supported on said member for rotation about an axis which is off-center with respect to the first mentioned axis, a yoke member having a wall thereof engageable with said roller, said structure incorporating guide means for guiding the movement of said yoke member along generally a straight line, said guide means comprising an elongated bar member which is centrally located with respect to said first axis and roller means engageable with opposite sides of said bar for guiding movement of the same, and a reciprocable cutting assembly rigidly connected to said yoke member, a second roller rotatably supported on said member coaxially with the first mentioned roller, said first mentioned roller and said second roller engaging different walls of said yoke member and rotating in opposite directions.

References Cited in the file of this patent

UNITED STATES PATENTS

| | | |
|---|---|---|
| 2,332,719 | Hilblom | Oct. 26, 1943 |
| 2,366,237 | Clausen | Jan. 2, 1945 |
| 2,476,314 | McCloskey | July 19, 1949 |
| 2,616,234 | Love | Nov. 4, 1952 |
| 2,630,670 | Sherman | Mar. 10, 1953 |
| 2,736,156 | Hardman | Feb. 28, 1956 |